United States Patent [19]
Brooks

[11] 4,081,184
[45] Mar. 28, 1978

[54] AMUSEMENT APPARATUS

[76] Inventor: Shirley R. Brooks, 4858 W. Erie, Chicago, Ill. 60644

[21] Appl. No.: 691,512

[22] Filed: Jun. 1, 1976

[51] Int. Cl.² .............................................. G11B 17/22
[52] U.S. Cl. .................................... 274/1 R; 274/10 D
[58] Field of Search ............ 340/162; 179/1 AT, 1 B, 179/1 C, 1 DD, 1 SW, 100.1 A, 100.11; 274/10 C, 10 R, 1 R; 194/15

[56] References Cited

U.S. PATENT DOCUMENTS

| | | | |
|---|---|---|---|
| 2,110,358 | 3/1938 | Dreisbach | 179/1 B |
| 2,557,245 | 6/1951 | Zillger | 179/100.11 |
| 2,628,280 | 2/1953 | Wilson et al. | 274/15 R |
| 2,634,402 | 4/1953 | Vanderzee et al. | 274/10 D |
| 3,240,498 | 3/1966 | Grossenheider et al. | 274/10 R |
| 3,521,889 | 7/1970 | Kelly et al. | 274/10 R |
| 3,806,820 | 4/1974 | Uchiyama | 179/1 SW |
| 4,006,306 | 2/1977 | Driscoll | 179/1 SW |

FOREIGN PATENT DOCUMENTS 868,508   4/1971   Canada ........................... 179/100.11

Primary Examiner—Harry N. Haroian
Attorney, Agent, or Firm—Robert D. Farkas

[57] ABSTRACT

This disclosure pertains to a remote stationary control box operating a coin operated automatic record selecting apparatus and public address system. The remote control box is provided with a tape player, microphone, and a record player, each of whose output signals are controlled by independent volume controls. Control switches allow the user to select which sound producing device, including the distant coin operated automatic record player, is to be operated. Mixing of signals allows the user to simulate the function of a radio broadcaster who presents musical selections and simultaneously or intermediately makes announcements and does accompanying. The control box programs record selections from the records stored within the distant automatic record player andfurther provides a pause switch which temporarily disables the beginning of play of an upcoming record therefrom.

8 Claims, 2 Drawing Figures

AMUSEMENT APPARATUS

BACKGROUND OF THE INVENTION

1. The Field of the Invention

This invention relates to coin operated audio tone amusement devices and more particularly to that class of remote control boxes, associated therewith, which introduces additional audio signals thereinto.

2. Description of the Prior Art

The prior art abounds with amusement apparatus control devices. U.S. Pat. No. 2,249,805 issued on July 22, 1941 to A. H. Bechtol teaches an electrical apparatus which permits a remote patron operated device to operate the functions of a distantly located amusement apparatus such as electric shooting gallery devices, automatic phonographs, and the like. This invention is limited to controlling the existing functions of the distantly located amusement apparatus. Similarly, the devices disclosed in U.S. Pat. No. 2,604,531 issued on July 22, 1952 to F. H. Osborne et al and U.S. Pat. No. 2,612,710 issued on Oct. 7, 1952 to P. M. Fuller teach a signalling method from the remote control box to the distantly located amusement apparatus, or an improved remotely controlled selector device having a novel display feature thereupon. In both cases, the distantly located amusement apparatus is controlled by the control box as to the order of presentation of the information previously stored therewithin. Though the patron may make selections of prior recorded information, he cannot, utilizing any part of the apparatus, introduce new information, such as his voice or additional musical selections.

SUMMARY OF THE INVENTION

A primary object of the present invention is to provide a remote control box for distantly located automatic record playing coin operated devices that enables the patron to interject additional audio signals into the amplifier circuits thereof.

Another object of the present invention is to provide a control apparatus which enables the patron to suspend the continuous presentation of recorded information stored within the distantly located automatic coin operated record playing device.

Still another object of the present invention is to provide a microphone attachment to the remote control box enabling the patron to vocally accompany and interpose messages with the otherwise produced audio signals available from the distantly located automatic coin operated record playing device.

Yet another object of the present invention is to provide selectively additional pre-recorded audio signals to the distantly located automatic coin operated record playing device.

Distantly located automatic coin operated record playing devices, commonly referred to as juke boxes, are often equipped with remote control boxes, enabling the patron to make a choice of the musical selections stored upon individual records within the automatic record playing device. A common design enables the patron to make a number of selections in accordance with the value of the coins inserted into a coin accepting slot located in the remote control box. The instant invention expands the utility of the remote control box by permitting the patron to assume control of the distantly located automatic coin operated record playing device so as to utilize the amplifier portion thereof at periods of time intermediate the playback of different records and concurrently therewith. During these periods of time, the patron may utilize a remotely located microphone and either a tape playing apparatus or an additional single record playing apparatus. Volume controls are provided so as to enable the patron to mix, and select, the level of audio signals produced by the microphone, tape player, and additional record player, before they are introduced into the input terminals of the audio amplifier located in the distantly located automatic coin operated record playing device. A pause control prevents the distantly located automatic coin operated record playing device from proceeding on to the next selection that has been pre-programmed, enabling the patron to utilize the control box apparatus without any signal injection from the records within the distantly located automatic coin operated record playing device. A release switch overrides the pause switch and enables the continued operation of the record selecting apparatus within the distantly located automatic coin operated record playing device. A coin mechanism, of the standard variety, activates the remote control box for time periods determined by the monetary value of the coins disposed therewithin, thus enabling the patron to fully control the signal producing elements in the control box and the distantly located automatic coin operated record playing device.

These objects, as well as other objects of the present invention, will become apparent more readily after reading the following description of the accompanying drawings.

DESCRIPTION OF THE PREFERRED EMBODIMENT

The structure and method of fabrication of the present invention is applicable to a housing, utilized as a remote control box to which is affixed a cartridge type tape playback mechanism and a conventional record player and tone arm apparatus. A microphone is connected to a cable extending outwardly from the control box, which is also provided with a coin accepting slot and a coin return slot. The instrument panel portion of the control box contains a pushbutton array utilized, in conventional fashion, to program the order of record selection to be made at the distantly located automatic coin operated record playing device. A series of control knobs independently control the volume of audio signals produced from the microphone, the tape player, the record player, and the sum total of all the audio signals aforementioned. Another control knob operates to control an internally mounted on-off power switch. A selector switch energizes the distantly located automatic coin operated record playing device and the tape playback mechanism and the record player apparatus. A pause switch is provided which sends a signal to the distantly located automatic coin operated record playing device interfering with the distantly located automatic coin operated record playing device's ability to make upcoming pre-programmed record selections. A release switch disables the pause switch aforementioned so as to enable the distantly located automatic coin operated record playing device to proceed with a record selection following the operation thereof occurring after the termination of play of a previously selected record in the distantly located automatic coin operated record playing device.

Figure 1:
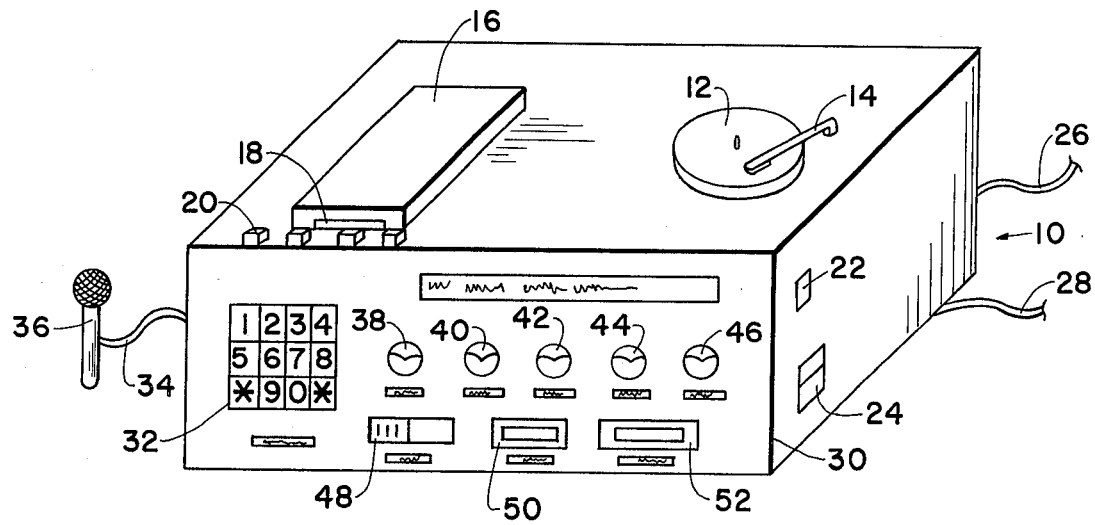
FIG. 1 is a perspective view of a remote control box.

Now referring to the figures, and more particularly to the embodiment illustrated in FIG. 1 showing the remote control housing 10 upon which is installed a record turn table 12 and an associated tone arm 14. A cartridge tape playing apparatus 16 is similarly fastened to housing 10 and is provided with a cartridge insertion slot 18 and cartridge playback control buttons 20 of conventional design. A coin insertion slot 22 accepts coins from the patron and is utilized in conjunction with a coin return slot 24. Flexible electrical cable 26 provides electrical energy to the electrical components housed within and associated with control box 10. Signal carrying cable 28 is utilized to convey electrical signals, both audio and of control variety, from control box 10 to the distantly located automatic coin operated record playing device, not shown. A plurality of control boxes may be utilized with a single distantly located automatic coin operated record playing device. Housing 30 also includes a distantly located automatic coin operated record playing device record selection control switch assembly 32. Audio cable 34 interconnects microphone 36 to a volume control knob 38. The output signal from the cartridge tape playing apparatus 16 is supplied to volume control knob 40. The sudio signal available from the tone arm 14 is supplied to the knob 42, operating a record volume control. Knob 44 operates as a main on-off power switch whilst knob 46 operates a master volume control, controlling the audio signal produced from microphone 36, cartridge tape player 16, and tone arm 14. Slide switch 48 controls the operation of the distantly located automatic coin operated record playing device and the tape transport within the cartridge tape player 16 and the motor operating the turntable 12. Pushbutton switch 50 is the pause switch controlling the record selecting apparatus within the distantly located automatic coin operated record playing device. Release switch 52 disables the pause switch 50.

Figure 2:
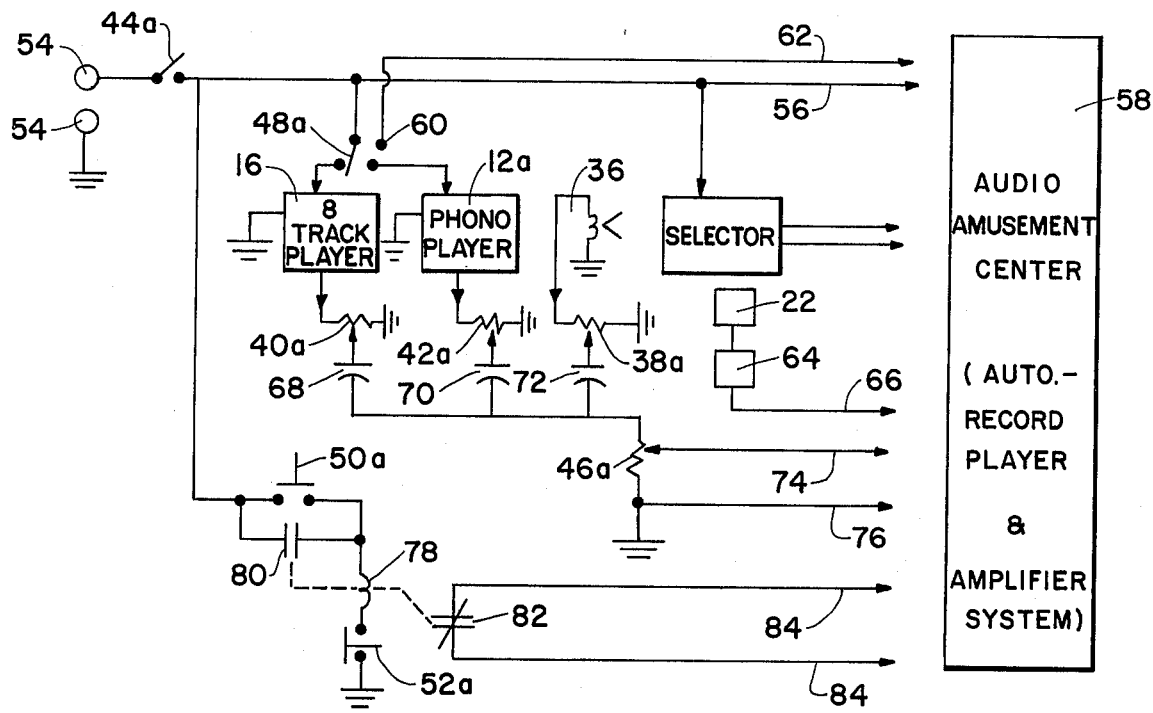
FIG. 2 is a combination block diagram and schematic of the control box and distantly located automatic coin operated record playing device.

FIG. 2 illustrates terminals 54 to which alternating current energy is applied. Switch 44a operates as a master on-off switch and controls the flow of electrical energy to all the components within the instant figure and in wire 56 supplying signalling voltage controlling display lights or other ancillary apparatus within the audio amusement center 58. Switch 48a provides alternating current selectively to the tape playback mechanism 16, the motor, not shown, operating turntable 12a, and utilizing contact 60, provides an electrical signal to wire 62 which can control any desired electrical function within audio amusement center 58, such as lights, remote speaker control switches, and the like. Coin accepting slot 22 is utilized in conjunction with coin counter 64 which, in conjunction with wire 66, enables audio amusement center 58 for a pre-determined time period. Volume control 40a controls the level of the output signal from tape player 16, and in conjunction with capacitor 68, provides a controlled audio signal to master volume control 46a. Volume control 42a controls the level of the output signal from tone arm 14, shown in FIG. 1, and in conjunction with capacitor 70, provides a controlled audio signal to master volume control 46a. Volume control 38a controls the level of the output signal from microphone 36, and in conjunction with capacitor 72, provides a controlled audio signal to master volume control 46a. Wire 74 provides the combined audio signal, available from the master volume control 46a to the audio amusement center 58. Ground 76 provides an interconnection from the ground circuits within the remote control apparatus depicted herein and its audio signal apparatus to audio amusement center 58. Pushbutton switch 50a, when depressed, energizes relay coil 78. Simultaneously therewith, normally open contacts 80 close, locking up relay coil 78 to the line, and normally closed contacts 82 open, which, through the use of wires 84, disables the record selecting mechanism within audio amusement center 58. Release pushbutton 52a, when depressed, de-energizes relay coil 78 and simultaneously closes contacts 82, enabling the record selection apparatus within audio amusement center 58.

One of the advantages is a remote control box for distantly located automatic coin operated record playing devices that enables the patron to interject additional audio signals into the amplifier circuits thereof.

Another advantage of the instant invention is a control apparatus which enables the patron to suspend the continuous presentation of recorded information stored within the distantly located automatic coin operated record playing device.

Still another advantage of the instant invention is a microphone attachment to the remote control box enabling the patron to vocally accompany and interpose messages with the otherwise produced audio signals available from the distantly located automatic coin operated record playing deivce.

Yet another advantage of the instant invention is selective additional pre-recorded audio signals to the distantly located automatic coin operated record playing device.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosures herein, but only by the appending claims.

The embodiment of the invention in which an exclusive privilege or property is claimed are defined as follows:

I claim:

1. In a distantly located automatic coin operated record playing device, said distantly located automatic coin operated record playing device having an audio amplifier and a record changing apparatus responsive to externally supplied record changing programming information and a plurality of phonograph records, the improvement comprising:

a. a remote control unit, said remote control unit having a housing,
b. cartridge tape playing means, said cartridge tape playing means affixed to said housing,
c. phonograph record playing means, said phonograph record playing means affixed to said housing,
d. microphone means, said microphone means electrically connected to the interior of said housing,
e. independent volume control means for independent control of the amplitude of the audio signals generated by said microphone means and said cartridge tape playing means and said phonograph record playing means,
f. combined audio amplitude control means for simultaneously controlling said audio signals generated by said microphone means and said cartridge tape playing means and said phonograph record playing means, g. pause means for selectively delaying the operation of said record changing apparatus, h. release means for negating said pause means, said release means permitting said record changing apparatus to become operative, and i. electrical interconnection means extending between said housing and said distantly located automatic coin operated record playing device and electrically coupling said remote control unit and said cartridge tape playing means and said phonograph playing means and said microphone means and said independent volume control means and said combined audio amplitude control means and said pause means and said release means together, whereby said phonograph playing means, and said microphone means and said cartridge tape playing means may be selectively operated individually and in combination with one another.

2. The improvement as claimed in claim 1 wherein said microphone means comprises a hand held microphone, an electrical cable, said hand held microphone having output terminals, one end of said electrical cable electrically connected to said output terminals, an opening in said housing, a portion of the length of said electrical cable adjacent said one end thereof passing through said opening whereby said microphone is sensitive to manually generated audible signals generated by a user, and providing a voltage signal to said independent volume control means.

3. The improvement as claimed in claim 1 wherein said independent volume control means comprises a plurality of potentiameters, each of said potentiameters electrically connected to a common terminal.

4. The improvement as claimed in claim 3 wherein said combined audio amplitude control means comprises a potentiameter, said potentiameter electrically connected to said common terminal.

5. The improvement as claimed in claim 1 wherein said pause means comprises a relay, a first momentary pushbutton switch, said relay energized upon closing the normally open contacts of said first momentary pushbutton switch.

6. The improvement as claimed in claim 5 wherein said release means comprises a second momentary pushbutton switch, said relay de-energized upon the opening of normally closed contacts of said second momentary pushbutton switch.

7. The improvement as claimed in claim 1 wherein said electrical interconnection means comprises a multi-conductor cable, one end of said multi-conductor cable electrically connected to said combined audio amplitude control means and said pause means and said release means, the other end of said multi-conductor cable electrically connected to said audio amplifier and said record changing apparatus in said distantly located automatic coin operated record playing device.

8. The improvement as claimed in claim 1 wherein said electrical interconnecting means comprises a pair of switches, said pair of switches selectively alternatively coupling either said cartridge tape playing means and said phonograph record playing means together in selective combination with said microphone means.

* * * * *